(12) United States Patent
Vialovos et al.

(10) Patent No.: US 11,834,003 B2
(45) Date of Patent: Dec. 5, 2023

(54) RECREATIONAL VEHICLE STEP ATTACHMENT DEVICE

(71) Applicants: James Vialovos, Fontana, CA (US); Mary Ann Vialovos, Fontana, CA (US)

(72) Inventors: James Vialovos, Fontana, CA (US); Mary Ann Vialovos, Fontana, CA (US)

(*) Notice: Subject to any disclaimer, the term of this patent is extended or adjusted under 35 U.S.C. 154(b) by 61 days.

(21) Appl. No.: 17/678,781

(22) Filed: Feb. 23, 2022

(65) Prior Publication Data

US 2023/0264632 A1    Aug. 24, 2023

(51) Int. Cl.
*B60R 3/00* (2006.01)

(52) U.S. Cl.
CPC .................... *B60R 3/007* (2013.01)

(58) Field of Classification Search
CPC .................. B60R 3/02; B60R 3/007
USPC .............................................. 182/92
See application file for complete search history.

(56) References Cited

U.S. PATENT DOCUMENTS

| | | | | |
|---|---|---|---|---|
| 2,493,639 A * | 1/1950 | Pellegrini | ............... | B60R 3/02 182/95 |
| 3,357,719 A * | 12/1967 | McCrea | ............... | B60R 3/007 182/92 |
| 3,407,901 A * | 10/1968 | Brammer | ............... | B60R 3/007 182/206 |
| 3,507,515 A * | 4/1970 | Brammer | ............... | B60R 3/02 280/166 |
| 3,716,254 A * | 2/1973 | Tarvin | ............... | B60R 3/02 280/166 |
| 3,897,084 A * | 7/1975 | Bergskoog | ............... | B60R 3/02 280/166 |
| 3,915,475 A * | 10/1975 | Casella | ............... | B60R 3/02 182/120 |
| 4,057,125 A * | 11/1977 | Kroft | ............... | B60R 3/007 D12/406 |
| 4,108,457 A * | 8/1978 | Garrett | ............... | B60R 3/02 182/95 |
| 4,198,070 A * | 4/1980 | Weiler | ............... | B60R 3/02 280/166 |
| 4,222,136 A * | 9/1980 | Valentino | ............... | A61G 7/053 5/507.1 |
| 4,264,084 A * | 4/1981 | Telles | ............... | B60R 3/02 182/115 |
| 4,274,648 A * | 6/1981 | Robins | ............... | B60R 3/02 280/166 |
| 4,664,227 A * | 5/1987 | Hansen | ............... | E04F 11/18 256/65.16 |

(Continued)

FOREIGN PATENT DOCUMENTS

CA        3081167        11/2020

*Primary Examiner* — Jeffrey J Restifo

(57) ABSTRACT

A recreational vehicle step attachment device for attaching a foldable step device to a recreational vehicle includes a frame. A footing base is coupled to a surface of the frame. Each base of a pair of bases is coupled to a respective one of each back corner of a pair of back corners. A pair of hinges of a plurality of hinges is coupled to a respective one of each of the bases. A folding support of a pair of folding supports is coupled to a respective one of the pair of hinges of the plurality of hinges. Each of the folding supports has an aperture and a hook. The aperture is circular and provides a space where a bolt can be inserted through to secure to a recreational vehicle stairs. The hook attaches to the recreational vehicle stairs to provide stability to the frame.

16 Claims, 4 Drawing Sheets

(56) References Cited

U.S. PATENT DOCUMENTS

Figure 1:
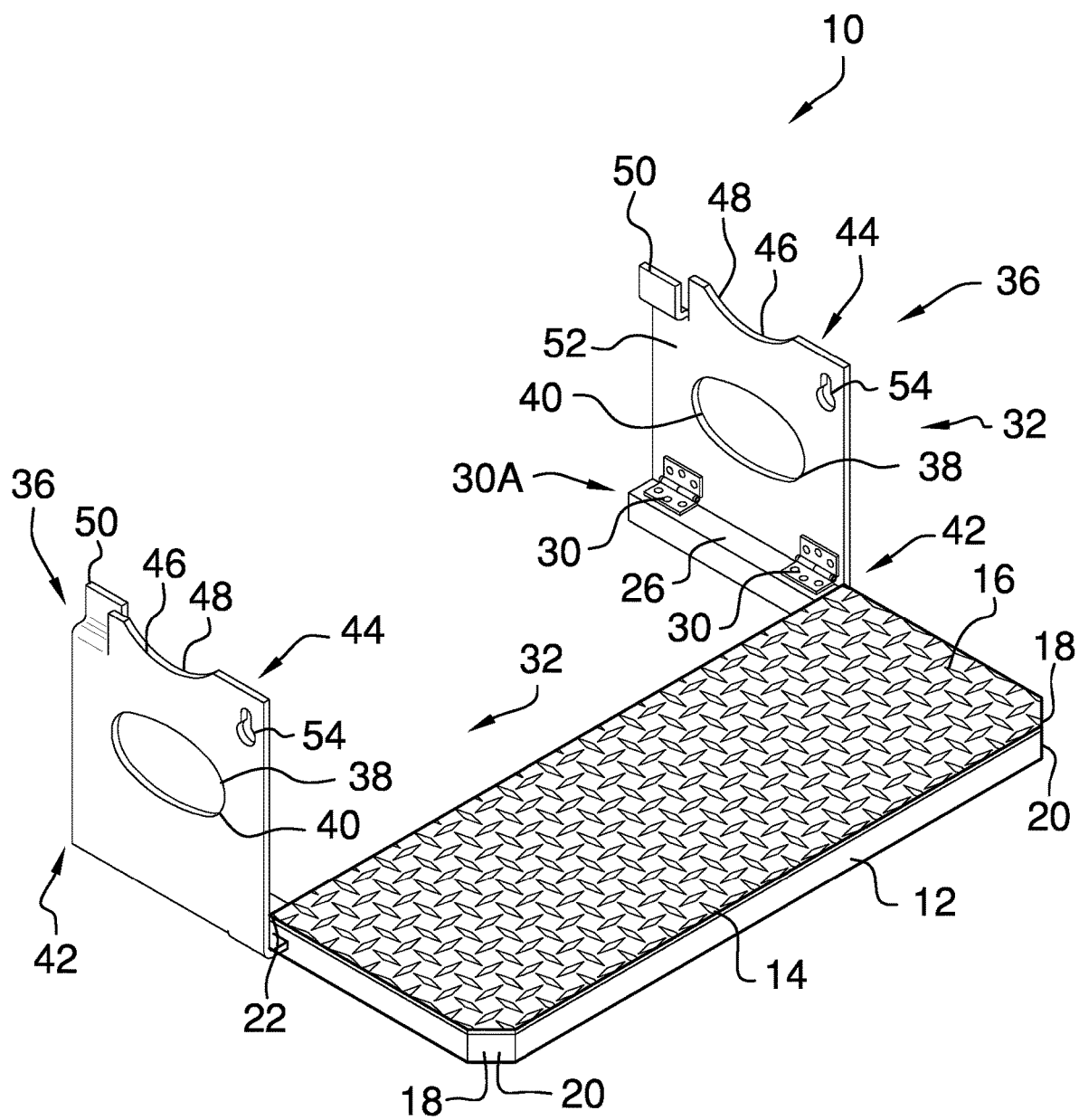

| Patent No. | | Date | Inventor | Classification |
|---|---|---|---|---|
| 4,753,447 A | * | 6/1988 | Hall | B60R 3/007 182/127 |
| 4,785,910 A | * | 11/1988 | Tonkovich | B60R 3/007 182/61 |
| 4,869,520 A | * | 9/1989 | Cole | E06C 7/081 182/127 |
| 4,911,264 A | * | 3/1990 | McCafferty | B25H 5/00 182/62 |
| 5,133,429 A | * | 7/1992 | Densley | B60R 3/007 280/165 |
| 5,547,040 A | * | 8/1996 | Hanser | B60R 3/02 182/127 |
| 5,620,059 A | * | 4/1997 | Crispeno | E06C 5/00 182/127 |
| 5,799,961 A | * | 9/1998 | Schmeets | E06C 5/00 280/169 |
| 5,803,475 A | * | 9/1998 | Dick | B60R 3/007 280/166 |
| 5,876,051 A | * | 3/1999 | Sage, Sr. | B60R 3/007 296/156 |
| 6,131,699 A | * | 10/2000 | Leak, Jr. | E06C 7/14 248/238 |
| 7,059,449 B2 | * | 6/2006 | Zhang | B60R 3/007 280/165 |
| 7,131,516 B1 | * | 11/2006 | Krol | E02B 3/20 182/206 |
| D537,399 S | * | 2/2007 | Riddle | D12/203 |
| 7,802,709 B1 | * | 9/2010 | Lewis | B60R 9/00 224/547 |
| 8,967,650 B1 | * | 3/2015 | Majors | B60R 3/00 280/163 |
| 9,981,608 B1 | * | 5/2018 | DoVale | B60D 1/58 |
| 10,053,016 B2 | | 8/2018 | Sorenson | |
| 10,351,065 B2 | * | 7/2019 | Aleman | B60R 3/007 |
| 2009/0243249 A1 | * | 10/2009 | Arvanites | B60R 3/007 280/166 |
| 2020/0369211 A1 | * | 11/2020 | Kay | B60R 3/02 |
| 2022/0227298 A1 | * | 7/2022 | Jackson | B60R 3/02 |

* cited by examiner

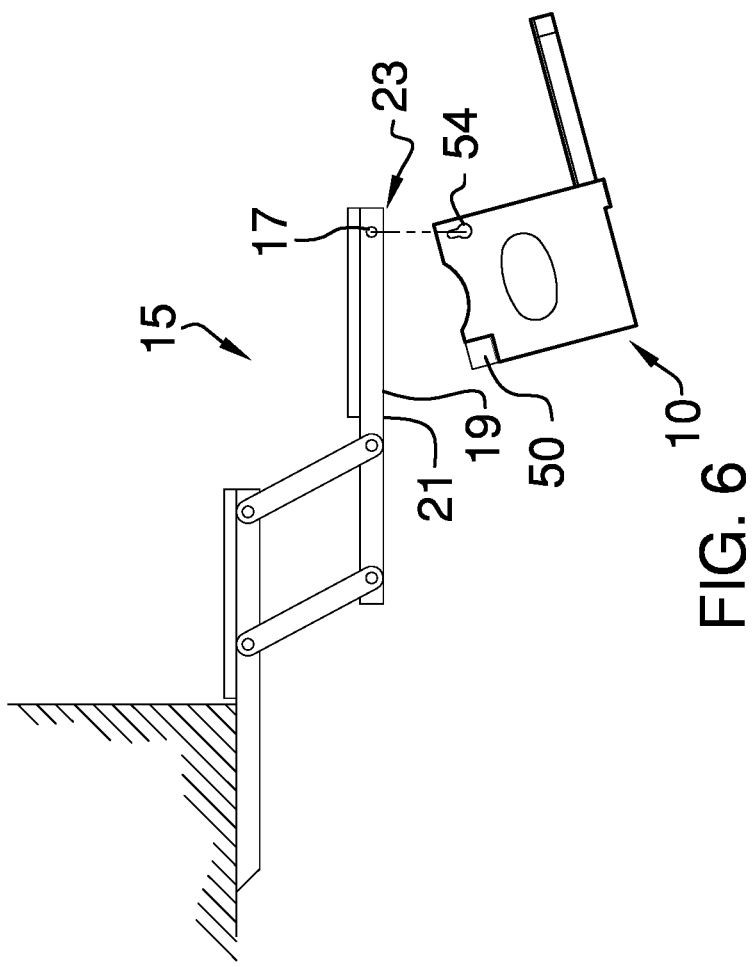
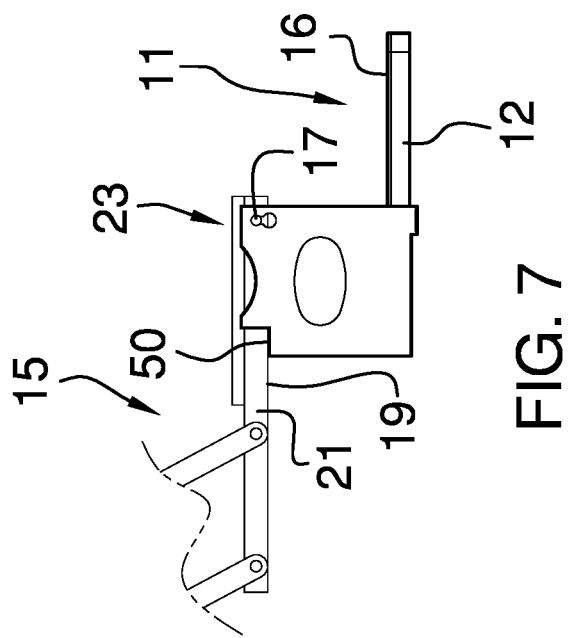

RECREATIONAL VEHICLE STEP ATTACHMENT DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to recreational vehicle step devices and more particularly pertains to a new recreational vehicle step device for attaching a foldable step device to a recreational vehicle.

(2) Description of Related Art Including Information Disclosed Under 37 CFR 1.97 and 1.98

The prior art relates to recreational vehicle step devices having an attachment function to recreational vehicles. The prior art includes a variety of recreational vehicle step devices having stackable steps. Furthermore, the prior art relates to a variety of recreational vehicle steps attaching to the existing steps of recreational vehicle. Known prior art lacks a recreational vehicle step device having a pair of folding supports that attach to the existing steps of recreational vehicle.

BRIEF SUMMARY OF THE INVENTION

An embodiment of the disclosure meets the needs presented above by generally comprising a frame. The frame has a surface and a footing base is coupled to the surface. The footing base is configured for the user to step onto. The frame has a pair of peripheral corners and a pair of back corners. The pair of peripheral corners faces the user. Each base of a pair of bases is coupled to a respective one of each of the back corners. Each of the bases is rectangular and each of the bases has a peripheral surface. A pair of hinges of a plurality of hinges is coupled to a respective one of the peripheral surface of each of the bases. Each of the hinges is configured for orienting the position of a folding support. Each folding support of a pair of folding supports is coupled to respective one of the pair of hinges of the plurality of hinges. Each of the folding supports has a free edge. An aperture is positioned proximate to the free edge of each of the folding supports. The aperture is configured for inserting a bolt through and engaging by threading to a recreational vehicle step.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is an isometric view of a recreational vehicle step attachment device according to an embodiment of the disclosure.

Figure 2:
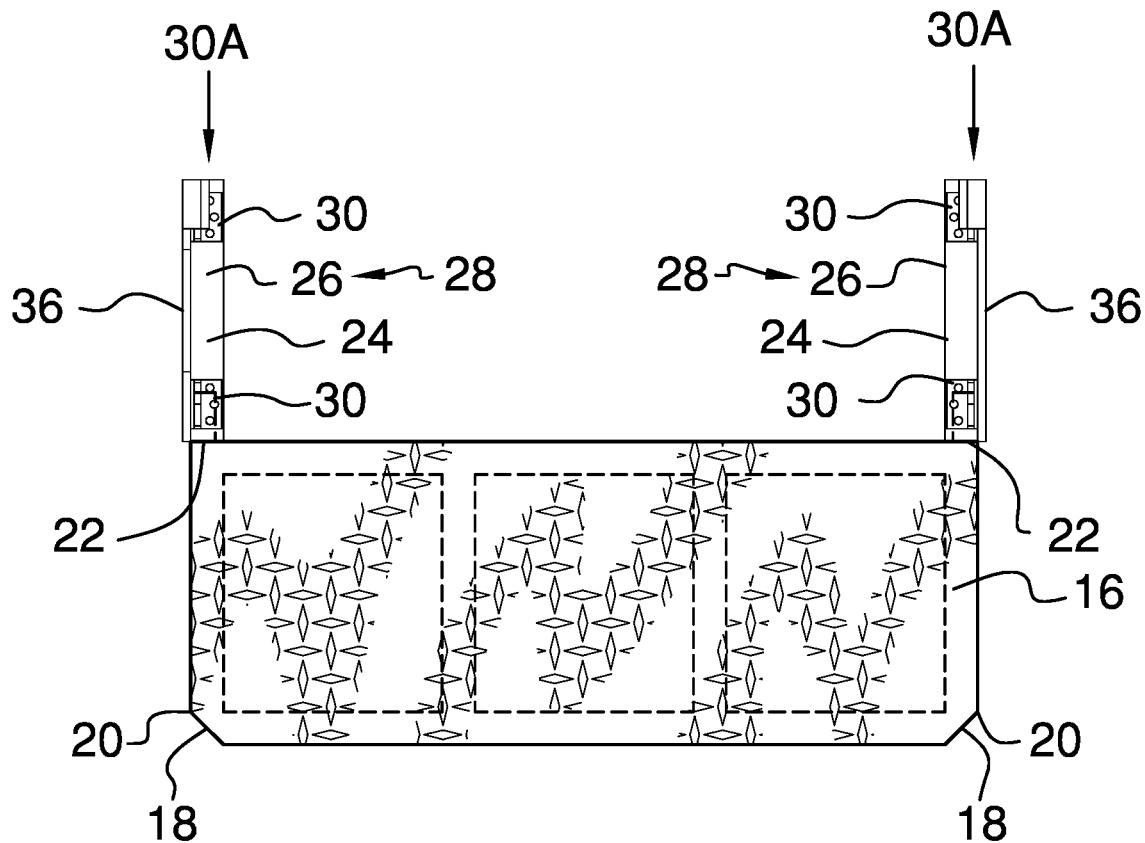
Figure 3:
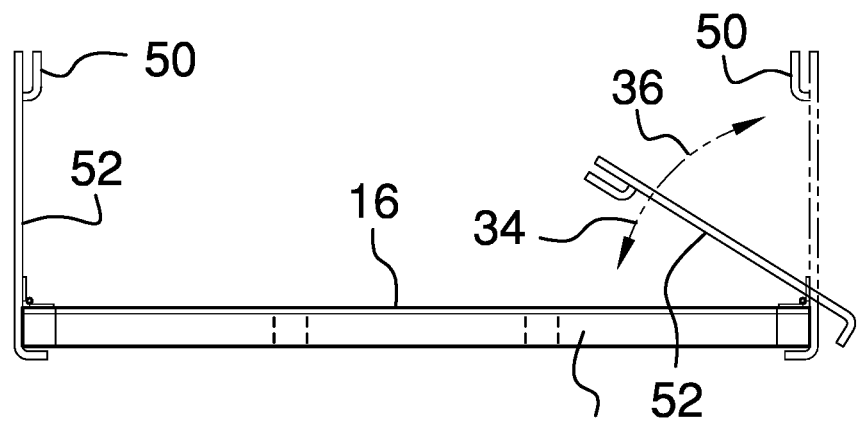
Figure 4:
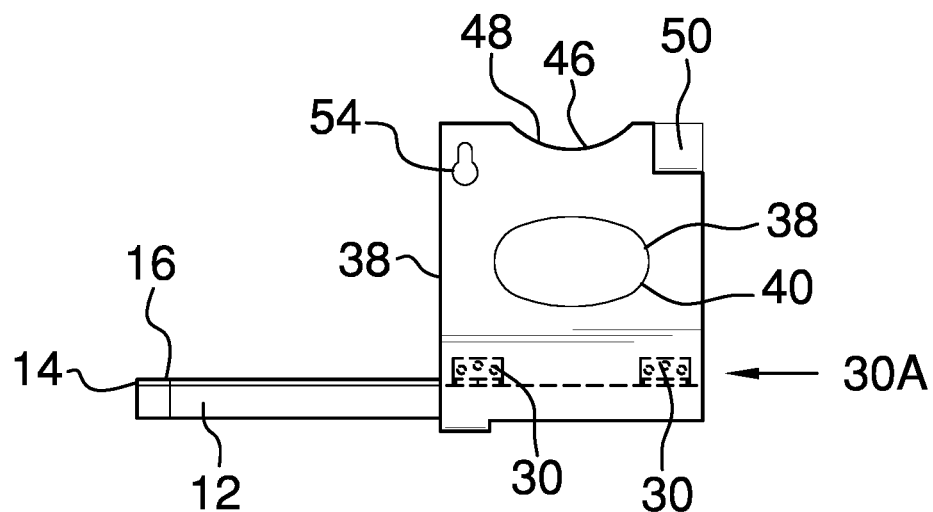
Figure 5:
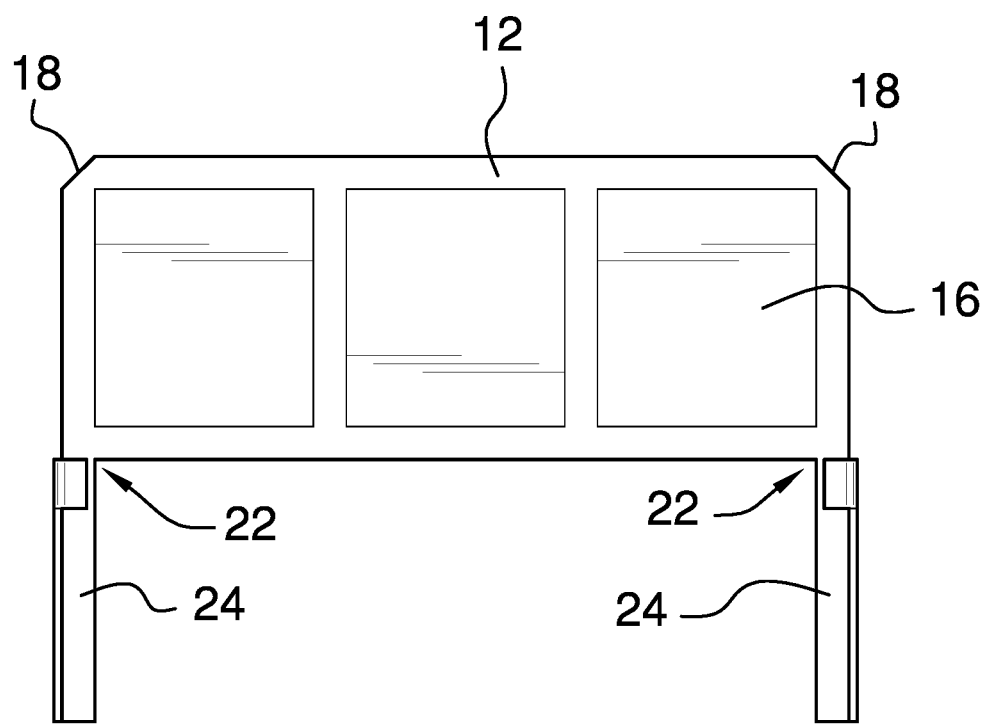

FIG. 2 is a top view of an embodiment of the disclosure.
FIG. 3 is a front view of an embodiment of the disclosure.
FIG. 4 is a side view of an embodiment of the disclosure.
FIG. 5 is a bottom view of an embodiment of the disclosure.
FIG. 6 is a detail view of an embodiment of the disclosure.
FIG. 7 is a detail view of an embodiment of the disclosure.

DETAILED DESCRIPTION OF THE INVENTION

With reference now to the drawings, and in particular to FIGS. 1 through 7 thereof, a new recreational vehicle step device embodying the principles and concepts of an embodiment of the disclosure and generally designated by the reference numeral 10 will be described.

As best illustrated in FIGS. 1 through 7, the recreational vehicle step attachment device 10 generally comprises a frame 12. The frame 12 has a rectangular shape. The frame 12 has a surface 14 and a footing base 16 is coupled to the surface 14. The frame 12 and the footing base 16 are configured for supporting the user 11 stepping on the footing base 16.

The frame 12 has a pair of peripheral corners 18. Each of the peripheral corners 18 has a chamfer cut out 20. The chamfer cut out 20 is defines a space that reduces damage due to environment impact. The pair of peripheral corners 18 is configured for being positioned facing the user 11 as shown in FIG. 1.

The frame 12 has a pair of back corners 22. Each base 24 of a pair of bases 24 is coupled to a respective one of each of the back corners 22 and protrudes out therefrom. Shown in FIG. 1, each of the bases 24 has a rectangular shape and each of the bases 24 has a peripheral surface 26.

The pair of peripheral surfaces 28 has a plurality of hinges 30. Each pair of hinges 30A of the plurality of hinges 30 is coupled to a respective one of each of the peripheral surfaces 28. Each of the hinges 30 is configured for being coupled to a folding support and orientating the position of the folding support to either a perpendicular position 32 or a parallel position 34 relative to the frame 12 as shown in FIG. 3.

Each folding support 36 of a pair of folding supports 36 is coupled to a respective one of each pair of hinges 30A of the plurality of hinges 30. Each of the folding supports 36 is a rectangular plate. Each of the folding supports 36 has an aperture 38 in a center of the rectangular plate. Shown in FIG. 4, the aperture 38 is an oval shape 40. The aperture 38 is configured for providing a place for the user 11 to grip.

Each of the folding supports 36 has a folding edge 42. Each of the hinges 30 is coupled to each of the folding supports 36 proximate to the folding edge 42. Each of the folding supports 36 has a free edge 44. The free edge 44 is parallel to the folding edge 42.

The free edge 44 has a cut out 46. The cut out is semicircular 48 and defines a space where the hand of the user 11 can grip each of the folding supports 36. An aperture 54 is positioned proximate to the free edge 44 of each of the folding supports 36. The aperture 54 is circular and is configured for each bolt 23 of a pair of bolts 23 to be inserted through to engage by threading with the recreational vehicle stairs 15.

A hook 50 is coupled to an inner surface 52 of each of the folding supports 36. The hook 50 is positioned proximate to the free end 44 of each of the folding supports 36. The hook 50 protrudes out and then protrudes at a ninety degree angle therefrom. The hook 50 of each of the folding supports 36 attaches to the recreational vehicle stairs 15 and provides stability and support to the frame 12 and to the footing base 16 when in use.

In use, the user 11 adjusts each of the folding supports 36 in the perpendicular position 32 relative to the frame 12. The user 11 then positions the aperture 54 of each of the folding supports 36 to be concentric to a respective one of each hole of a pair of holes 17 of the recreational vehicle stairs 15 as shown in FIG. 6. Each bolt 23 of the pair of bolts 23 is inserted through a respective one of the aperture 48 of each of the folding supports 36 into each of the holes 17. The pair of bolts 23 engages by threading to the pair of holes 17 of the recreational vehicle stairs 15.

The hook 50 of each of the folding supports 36 latches onto an edge 19 of a bottom surface 21 of the recreational vehicle stairs 15 as shown in FIG. 7. The hook 50 provides stability to the frame 12 and impedes the frame 12 from movement. Furthermore, the hook 50 provides support to the footing base 16 when in use.

The user 11 steps on the footing base 16 of the recreational vehicle step attachment device 10, and then can easily access the recreational vehicle stairs 15. When not in use, the user 11 removes the pair of bolts 23 from the pair of holes 17 of the recreational vehicle stairs 15. The user 11 detaches the hook 50 from the edge 19 of the bottom surface 21 of the recreational vehicle stairs 15. Succeeding, the user 11 adjusts each of the folding supports 36 into the parallel position 34 relative to the frame 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A recreational vehicle step attachment device comprising:
    a frame, said frame having a pair of peripheral corners, said frame having a surface, a footing base being coupled to said surface, said frame having a pair of back corners;
    a pair of bases, each of said bases being coupled to a respective one of each of said back corners, each of said bases having a peripheral surface;
    a plurality of hinges, a pair of hinges of said plurality of hinges being coupled to a respective one of said peripheral surface of each of said bases; and
    a pair of folding supports, each of said folding supports being coupled to a respective one of each pair of hinges of said pair of hinges, each of said folding supports having a free edge, a aperture being positioned proximate to said free edge of each of said folding supports, said aperture of said free edge being configured for inserting a bolt through and attaching to an recreational vehicle trailer step, each of said folding supports being a rectangular plate.

2. The recreational vehicle step attachment device of claim 1, further comprising a frame, said frame being a rectangular shape.

3. The recreational vehicle step attachment device of claim 1, further comprising each of said peripheral corners having a chamfer cut.

4. The recreational vehicle step attachment device of claim 3, further comprising said pair of peripheral corners being configured for facing the user.

5. The recreational vehicle step attachment device of claim 1, further comprising said footing base being configured for being stepped on.

6. The recreational vehicle step attachment device of claim 1, further comprising said pair of hack corners being parallel to said pair of peripheral corners.

7. The recreational vehicle step attachment device of claim 1, further comprising each of said bases protruding out from a respective one of each of said back corners.

8. The recreational vehicle step attachment device of claim 7, further comprising each of said bases being a rectangular shape, each of said bases having a peripheral surface.

9. The recreational vehicle step attachment device of claim 1, further comprising each of said hinges being configured for coupling to a folding support.

10. The recreational vehicle step attachment device of claim 1, further comprising each of said folding supports having an aperture in a center of said rectangular plate, said aperture being an oval.

11. The recreational vehicle step attachment device of claim 1, further comprising each of said folding supports having a folding edge, each of said folding supports being coupled to each of said hinges proximal to said folding edge of each of said folding supports.

12. The recreational vehicle step attachment device of claim 1, further comprising said free edge having a hook, said hook being configured for attaching each of said folding supports to a recreational vehicle trailer.

13. The recreational vehicle step attachment device of claim 1, further comprising said aperture of said free edge being circular.

14. A recreational vehicle step attachment device comprising:
- a frame, said frame having a pair of peripheral corners, said frame having a surface, a footing base being coupled to said surface, said frame having a pair of back corners;
- a pair of bases, each of said bases being coupled to a respective one of each of said back corners, each of said bases having a peripheral surface;
- a plurality of hinges, a pair of hinges of said plurality of hinges being coupled to a respective one of said peripheral surface of each of said bases; and
- a pair of folding supports, each of said folding supports being coupled to a respective one of each pair of hinges of said pair of hinges, each of said folding supports having a free edge, a aperture being positioned proximate to said free edge of each of said folding supports, said aperture of said free edge being configured for inserting a bolt through and attaching to an recreational vehicle trailer step, said free edge having a cut out, said cut out being semicircular.

15. The recreational vehicle step attachment device of claim 14, further comprising said cut out defines a space where a hand of the user can grip each of the folding supports.

16. A recreational vehicle step attachment device comprising:
- a frame, said frame being a rectangular shape, said frame having a pair of peripheral corners, each of said peripheral corners having a chamfer cut, said pair of peripheral corners being configured for facing the user, said frame having a surface, a footing base being coupled to said surface, said footing base being configured for being stepped on, said frame having a pair of back corners, said pair of back corners being parallel to said pair of peripheral corners;
- a pair of bases, each of said bases being coupled to a respective one of each of said back corners, each of said bases protruding out from a respective one of each of said back corners, each of said bases being a rectangular shape, each of said bases having a peripheral surface;
- a plurality of hinges, a pair of hinges of said plurality of hinges being coupled to a respective one of said peripheral surface of each of said bases, each of said hinges being configured for coupling to a folding support; and
- a pair of folding supports, each of said folding supports being a rectangular plate, each of said folding supports having an aperture in a center of said rectangular plate, said aperture being an oval, each of said folding supports having a folding edge, each of said folding supports being coupled to a respective one of each pair of hinges of said pair of hinges, each of said folding supports being coupled to each of said hinges proximal to said folding edge of each of said folding supports, each of said folding supports having a free edge, said free edge having a hook, said hook being configured for attaching each of said folding supports to a recreational vehicle trailer, a aperture being positioned proximate to said free edge of each of said folding supports, said aperture of said free edge being circular, said aperture of said free edge being configured for inserting a bolt through and attaching to an recreational vehicle trailer step, said free edge having a cut out, said cut out being semicircular, said cut out defines a space where a hand of the user can grip each of the folding supports.

* * * * *